United States Patent
Hopf et al.

(10) Patent No.: US 6,738,340 B2
(45) Date of Patent: May 18, 2004

(54) DEVICE FOR REDUCING THE RADIAL AND AXIAL PLAY OF A MOTOR SHAFT IN A DECK FOR PLAYING INFORMATION DISCS

(75) Inventors: Christian Hopf, Wetzlar (DE); Norbert Kunze, Diez (DE); Stefan Mueller, Wetzlar (DE); Horst Rumpf, Herborn (DE); Cornelius Wouters, Kuringen (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 254 days.

(21) Appl. No.: 09/969,006

(22) Filed: Oct. 2, 2001

(65) Prior Publication Data

US 2002/0085479 A1 Jul. 4, 2002

(30) Foreign Application Priority Data

Oct. 6, 2000 (DE) ........................ 100 49 499

(51) Int. Cl.⁷ .................. G11B 23/00; G11B 25/00; H02K 5/24; H02K 49/02; H02P 15/00
(52) U.S. Cl. .................. 369/264; 310/51; 310/105; 369/269
(58) Field of Search ................. 369/264, 263, 369/265, 266, 270, 271, 269, 258, 176; 360/98.07, 98.08; 310/51, 105, 103, 90.5

(56) References Cited

U.S. PATENT DOCUMENTS

| 2,073,431 A | 3/1937 | Trenzen ............ 176/122 |
| 4,730,299 A | 3/1988 | Kamoshita et al. ......... 369/264 |
| 5,300,849 A | * 4/1994 | Elsässer ................. 310/90.5 |
| 5,463,511 A | 10/1995 | Nakano et al. .......... 460/99.08 |
| 5,748,406 A | * 5/1998 | Morimoto et al. ....... 360/99.12 |

FOREIGN PATENT DOCUMENTS

| EP | 1048863 A2 | 11/2000 |
| JP | 62030565 | 2/1987 |
| JP | 5-236709 A | * 9/1993 |
| WO | WO9110996 | 7/1991 |

* cited by examiner

Primary Examiner—Julie Anne Watko
(74) Attorney, Agent, or Firm—Michael E. Belk

(57) ABSTRACT

The invention relates to a device in a deck for playing information discs (2), which preferably have been provided or can be provided with digital information, the information disc (2) being rotated, in the operating condition, about its center by a drive motor (5) and magnetically cooperating material parts (8, 9) being present, which are offset radially with respect to the axis of rotation (3) and in the direction thereof parallel with respect to one another and of which one part (8) is disposed on the base plate (4) which carries the motor (3) and of which the other part (9) is disposed on the disc support (1) which is moved by the motor shaft (6), one of the material parts (8, 9) being a ring-shaped permanent magnet, at least one of the two magnetically cooperating material parts (8, 9) being arranged eccentrically with respect to the axis of rotation (3) and both material parts (8, 9) are ring-shaped, the directions of the lines of field not being changed during rotation.

13 Claims, 1 Drawing Sheet

Figure 1:
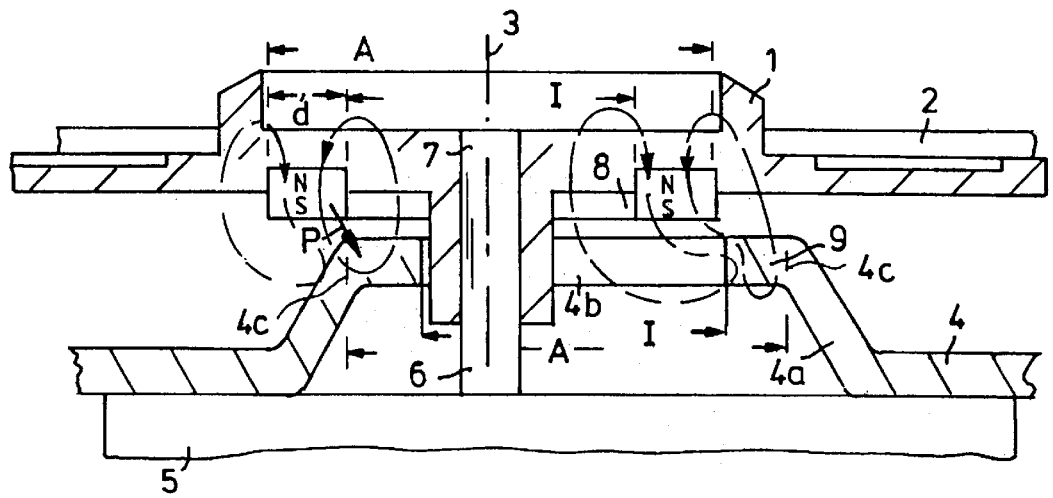

DEVICE FOR REDUCING THE RADIAL AND AXIAL PLAY OF A MOTOR SHAFT IN A DECK FOR PLAYING INFORMATION DISCS

The invention relates to a device in a deck for playing information discs, which preferably have been provided or can be provided with digital information, the information disc being rotated, in the operating condition, about its center by means of a drive motor and magnetically cooperating material parts being present, which are offset radially with respect to the axis of rotation and in the direction thereof parallel with respect to one another and of which one part is disposed on the base plate which carries the motor and of which the other part is disposed on the disc support which is moved by the motor shaft, one of the material parts being a ring-shaped permanent magnet.

WO 91/10996 discloses a deck for CD discs, which has magnet arrangements that serve to preclude play of the motor shaft. For this purpose, one embodiment has a permanent magnet ring and a ferromagnetic circular segment mounted on a base plate. The shaft of a drive motor extends through the permanent magnet ring without contact. The disc support carries a ferromagnetic disc. The permanent magnet and the disc are arranged centrically in parallel radial planes with respect to the axis of rotation of the system, offset from one another in the direction of the axis of rotation.

In another embodiment the permanent magnet ring is mounted on the disc support. The ferromagnetic circular segment is bent out of the base plate and is arranged closely adjacent the permanent magnet ring.

The magnetic force of attraction between the permanent magnet and the ferromagnetic disc ensure that axial play is eliminated. The ferromagnetic circular segment serves to preclude radial play of the motor shaft with the aid of the magnetic force of attraction.

This construction has the disadvantage that the circular segment continually produces impulse-like fluctuations of the magnetic field and has an adverse effect on the motor power.

Moreover, it is known from U.S. Pat. No. 4,730,299 to construct the ferromagnetic part on the disc support as a disc in order to preclude axial play.

It is an object of the invention to provide a device in a deck for playing information discs, which precludes axial and radial play of the motor shaft by means of a simple and flat construction which does not give rise to load fluctuations of the motor and is without wear.

According to the invention said object is achieved in that at least one of the two magnetically cooperating material parts is arranged eccentrically with respect to the axis of rotation and both material parts are ring-shaped, the directions of the lines of field not being changed during rotation.

This eccentric construction has the advantage that only two magnetically cooperating ring-shaped material parts are required in order to eliminate both axial and radial play of the motor shaft. Depending on the requirements both or only one of the two magnetically cooperating material parts may be permanent magnetic. As a result of the continuously ring-shaped construction of the two cooperating material parts the directions of the lines of field does not change during rotation.

In a further embodiment of the invention the two magnetically cooperating material parts surround the axis of rotation at a distance and the inner diameter and the outer diameter are substantially equal. The combined exerted forces lead to a play compensation which is uniform and, in particular, impulse free.

In a further embodiment of the invention the ring-shaped material part which forms a ferromagnetic ring is a part of the ferromagnetic motor support, which part is a raised portion around the motor shaft and forms a ring in a higher plane, which ring surrounds the motor shaft at a distance. The ferromagnetic ring thus forms a part of the motor support.

An embodiment of the invention is constructed in such a manner that the material part formed as a permanent magnet ring is arranged centrically on the disc support in a radial plane parallel to the ferromagnetic ring which is disposed eccentrically with respect to the motor shaft. In this case the ferromagnetic ring and the permanent magnet ring are superposed eccentrically with respect to one another.

In this embodiment it has proved to be effective when the permanent magnet ring is axially magnetized.

Another embodiment of the invention is constructed in such a manner that the permanent magnet ring is arranged centrically on the disc support in one radial plane with the ferromagnetic ring which is disposed eccentrically with respect to the motor shaft. This means that in this way the overall height can be reduced.

In this embodiment it has proved to be effective if the permanent magnet ring is radially magnetized.

The invention will be described in more detail with reference to the drawing.

Figure 2:
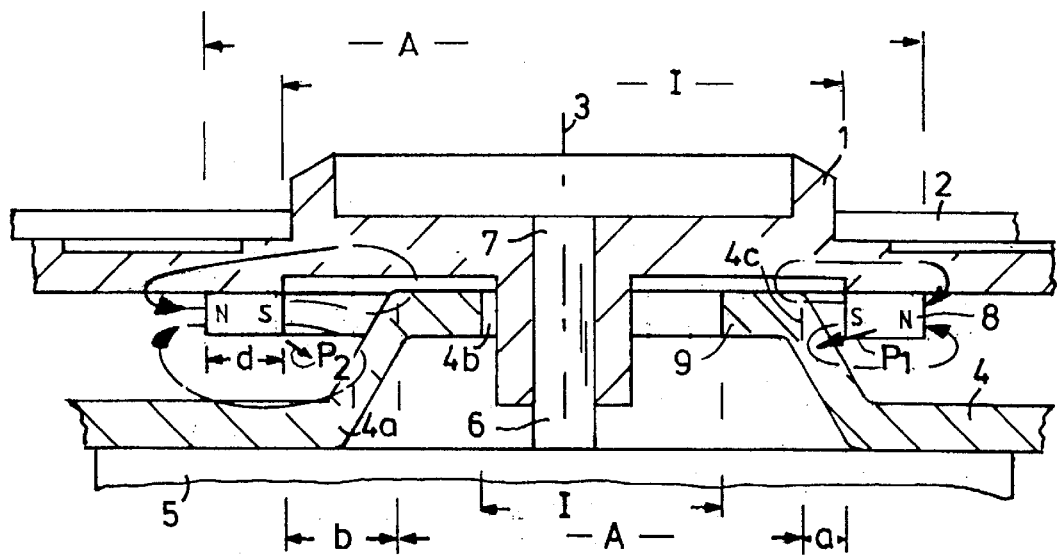

In the Drawing:

FIG. 1 is a sectional view of a part of a deck for playing digital information discs, where a permanent magnet ring is arranged centrically on a turntable carried by a motor shaft, the ferromagnetic support of the drive motor having a raised portion in the lead-through area of the motor shaft and forming a ferromagnetic second ring, which is eccentric with respect to the permanent magnet ring and which is disposed in a plane parallel to the permanent magnet ring, FIG. 2 is a sectional view of a part of a deck for playing digital information discs, where a permanent magnet ring is arranged centrically on a turntable carried by a motor shaft, the ferromagnetic support of the drive motor having a raised portion in the lead-through area of the motor shaft and forming a ferromagnetic ring, which is eccentric with respect to the permanent magnet ring and cooperates with the latter in substantially the same plane.

FIG. 1 is a sectional view which shows the disc support 1 of a deck for information discs 2 for digital information. Such information discs 2 are commonly referred to as, for example, CD, DVD, CD-ROM etc. The information discs 2 are rotated about a central axis of rotation 3 by means of the disc support 1.

A base plate 4 has been provided as motor support and carries a drive motor 5 whose motor shaft 6 can rotate the disc support 1. For this purpose, the motor shaft 6 carries the disc support 1 on its upper end 7.

A magnet arrangement has been provided in order to eliminate axial and radial play of the motor shaft 6 and consists of material parts 8 and 9 which cooperate magnetically with one another. One of the magnetically cooperating material parts, which are axially superposed, is a permanent magnet ring 8, which is arranged on the disc support 1 centered with respect to the motor shaft 6. The other material part is a ferromagnetic ring 9, which forms a part of the motor support 4, through which the motor shaft 6 extends. This ferromagnetic ring 9 is formed by a raised portion 4a, which is a raised part of the motor support 4 in the area of the shaft lead-through 4b, which portion surrounds the motor shaft 6. Thus, the ferromagnetic ring 9 is formed in a higher plane. The raised portion 4a in the area of the shaft lead-through 4b in the present embodiment is eccentric with respect to the permanent magnet ring 8. The inner diameter I of the shaft lead-through 4b corresponds substantially to the inner diameter I of the permanent magnet ring 8. The eccentricity of the ferromagnetic ring 9 with respect to the permanent magnet ring 8 corresponds substantially to the radial material width d of the permanent magnet ring 8. The outer diameters A of the permanent magnet ring 8 and the magnetically relevant ferromagnetic ring 9 are also substantially equal. The outer boundary of the magnetically active part of the raised portion 4a is shown in broken lines 4c.

Preferably, the permanent magnet ring 8 is axially magnetized. Radial magnetization is also possible. Between the permanent magnet ring 8 and the ferromagnetic ring 9 a force P is produced with a field of force which renders the motor shaft play-free without alternating impulses in order to guarantee a uniform operation.

FIG. 2 shows an arrangement which is modified in comparison with the construction shown in FIG. 1. A base plate 4 which serves as motor support has been provided, which carries a motor 5 whose motor shaft 6 can rotate the disc support 1. For this purpose, the motor shaft 6 carries the disc support 1 on its upper end 7.

The permanent magnet ring 8 is also arranged on the disc support 1 centrically with respect to the motor shaft 6. It surrounds the ferromagnetic ring 9, which forms the upper flat part of the raised portion 4a. The ferromagnetic ring 9 and the permanent magnet ring 8 are thus disposed at least substantially in one radial plane. The raised portion 4a in the area of the shaft lead-through 4b, where the ferromagnetic ring 9 as shown in FIG. 1 is formed, is eccentric with respect to the disc support 4 and, consequently, eccentric with respect to the permanent magnet ring 8. The eccentricity of the permanent magnet ring 8 with respect to the ferromagnetic ring 9 is approximately equal to the radial material width d of the ferromagnetic ring 9. In general, it holds that for the eccentricity a is unequal to b.

Preferably, the permanent magnet ring 8 is radially magnetized. Between the permanent magnet ring 8 and the ferromagnetic ring 9 a force P a field of force is produced which renders the motor shaft play-free without alternating impulses in order to guarantee a uniform operation.

The distances a and b between the rings 8 and 9 are unequal at the right and at the left owing to the eccentricity that exists. This is shown in FIG. 2. As a result of the eccentricity of the magnetically cooperating parts 8 and 9 the magnetic lines of force are distorted in the direction of the eccentricity. As is shown in FIG. 2, forces P1 and P2 which are oriented obliquely with respect to the axis 3 are produced between the rings 8 and 9, by means of which the play between the motor shaft 6 and its bearing in the motor support 4 are unilaterally compensated for both in the axial and in the radial direction. The force P1, for which the permanent magnet ring 8 is disposed nearer the ferromagnetic ring 9, is then greater than the force P2, for which the permanent magnet ring 8 is disposed farther from the ferromagnetic ring 9.

What is claimed is:

1. A device in a deck for rotating art information disc (2), in an operating condition, about an axis of rotation by means of a drive motor and magnetically cooperating material parts (8, 9) that are offset radially with respect to the axis of rotation (3) and with respect to one another, wherein one part is disposed on the base plate (4) which carries the motor and the other part is disposed on the disc support (1) which is moved by the motor shaft (6), one of the material parts (8, 9) being a ring-shaped permanent magnet, characterized in that at least one of the two magnetically cooperating material parts (8, 9) is arranged eccentrically with respect to the axis of rotation (3) and both material parts (8, 9) are ring-shaped, the directions of the lines of field not being changed during rotation, wherein the two magnetically cooperating material parts (8, 9) surround the axis of rotation (3) at a distance and the inner diameter (1) and the outer diameter (A) of the two magnetically cooperating material parts are substantially equal.

2. A device as claimed in claim 1, characterized in that the ring-shaped material part which forms a ferromagnetic ring (9) is a part of the ferromagnetic motor support (4), which part is a raised portion around the motor shall (6) and forms a ring in a higher plane, which ring surrounds the motor shaft (6) at a distinct.

3. A device as claimed in claim 1, characterized in that the material part formed on the disc support is formed as a permanent magnet ring (8) and arranged centrically on the disc support (1) in a radial plane parallel to the ferromagnetic ring (9) which is disposed eccentrically with respect to the motor shaft (6).

4. A device as claimed in claim 3, characterized in that the permanent magnet ring (8) is axially magnetized.

5. A device as claimed in claim 1, characterized in that the magnetically cooperating material part formed on the disc support is a permanent magnet ring (8) is arranged centrically on the disc support (1) in one radial plane with the magnetically cooperating material formed on the base plate (9) which is disposed eccentrically with respect to the motor shaft (6).

6. A device as claimed in claim 5, characterized in that the permanent magnet ring (8) is radially magnetized.

7. A device for rotating information discs about an axis of rotation comprising:

a drive motor having a base plate disposed thereon;

a disc support moved by a motor shaft coupled to the motor;

a plurality of magnetically cooperating material parts that are radially offset with respect to the axis of rotation (3) and with respect to one another;

a first of the magnetically cooperating parts being disposed on the base plate and a second of the magnetically cooperating parts being disposed on the disc support, wherein at least one of the flint and second magnetically cooperating parts is a ring-shaped permanent magnet, and at least one of the first and second magnetically cooperating material parts is arranged eccentrically with respect to the axis of rotation, wherein the two magnetically cooperating material parts have an inner diameter and an outer diameter that are substantially equal.

8. A device as claimed in claim 7, wherein both the first and second magnetically cooperating parts are ring-shaped creating a magnetic field having field lines that do not change during rotation.

9. A device as claimed in claim 7, wherein to magnetically cooperating part disposed on the base plate further comprises a ring-shaped magnetic material formed on the base plate such that the ring shaped magnetic material is part of a raised portion of the base plate around the motor shaft.

10. A device as claimed in claim 7, wherein the magnetically cooperating part formed on the disc support is magnetic ring arranged centrically with respect to the disc support in a radial plane parallel to the magnetically cooperating part formed on the base plate and the magnetically cooperating part formed on the base plate is disposed eccentrically with respect to the motor shaft.

11. A device as claimed in claim 7, wherein the magnetically cooperating part formed on the disc support is axially magnetized.

12. A device as claimed in claim 7, wherein the magnetically cooperating part formed on the disc support is arranged centrically on the disc support in a radial plane with the magnetically cooperating part formed on the base support which is disposed eccentrically with respect to the motor shaft.

13. A device as claimed in claim 7 wherein the magnetically cooperating part formed on the disc support is radially magnetized.

\* \* \* \* \*